Patented Apr. 28, 1925.

1,535,525

UNITED STATES PATENT OFFICE.

CARL F. GALLIGAN, OF BERKELEY, CALIFORNIA, ASSIGNOR, BY DIRECT AND MESNE ASSIGNMENTS, TO F. A. FRAZIER COMPANY, OF SAN FRANCISCO, CALIFORNIA, A CORPORATION OF CALIFORNIA.

SPRAY MIXTURE AND PROCESS OF MAKING THE SAME.

No Drawing.   Application filed August 23, 1923. Serial No. 658,999.

*To all whom it may concern:*

Be it known that I, CARL F. GALLIGAN, a citizen of the United States, and a resident of Berkeley, county of Alameda, and State of California, have invented a certain new and useful Spray Mixture and Process of Making the Same, of which the following is a specification.

My invention relates to a spray mixture to be used as a fungicide and an object of the invention is the production of a spray mixture having all the values and effectiveness of a well made Bordeaux mixture but free of the difficulties and disadvantages attending the compounding and use of that mixture.

Another object of my invention is the provision of ingredients for the making of a spray mixture, such as I have referred to, which retain, under normal conditions, their original and desired quality of miscibility and which may be readily and quickly mixed with water by inexpert and inexperienced persons to form a solution characterized by great stability and the effectiveness of a properly made Bordeaux mixture.

My invention possesses other objects and features of advantage, some of which, with the foregoing will be set forth in the following description of my invention. It is to be understood that I do not limit myself to the showing made by the said description, as I may adopt variant forms of my invention within the scope of the claims.

The use of Bordeaux mixture on trees, vines and other plants to control mildew, scabs and other fungus growths has long been practiced. Nearly every farmer or rancher is troubled to a more or less degree by these pests which greatly impair the condition of the trees or vines and consequently reduce the fruit yield. Spraying with Bordeaux mixture has been one of the most common and effective methods of combating this trouble. The compounding and use of Bordeaux mixture, however has been attended with so many difficulties, that many persons have abandoned its use for other spray materials.

The common method of preparing Bordeaux mixture is to dissolve copper sulphate ($CuSO_4.5H_2O$) in water, and in another container lime (CaO) is mixed with water. These two mixtures are then combined, and sufficient water added to make the desired consistency. Copper sulphate dissolves very slowly and the several operations must be performed with considerable exactness to produce a good spray. For these reasons and because of the undoubted efficacy of Bordeaux mixture in combating pests, there has grown up an insistent demand for a ready prepared material or materials from which an unskilled worker may quickly and with certainty produce a superior Bordeaux spray. So far as I am aware the demand has not been met successfully. Furthermore the necessity of promptly using the Bordeaux mixture, as usually prepared, and the need for its constant agitation during use, are no small factors of inconvenience and waste.

In accordance with my invention I use substantially equal parts of calcium oxide (CaO) which prefreably has first been hydrated to form calcium hydroxide ($Ca(OH)_2$), and copper sulfate ($CuSO_4.5H_2O$). The copper sulfate is crushed and placed in a drier where from two per cent to four per cent of the water of crystallization is driven off. To this dried copper sulfate a carbohydrate such as dextrine, dextrose, saccharose or starch is added in a volume equivalent to the amount of water evaporated. Because of its relative cheapness and its effectiveness, I prefer to use corn starch ($C_6H_{10}O_5$). The whole mass is then ground to pass thru a 50-mesh screen.

The second step consists in thoroly mixing with the calcium oxide or preferably powdered calcium hydroxide approximately 3% of calcium caseinate.

The products of these two steps are packed separately in tight packages, holding the same quantity, and for convenience the sulfate mixture may be marked "A", and the other marked "B". When it is desired to prepare a spray the contents of the package "A" is sifted into the spray tank while it is being filled with water and agitated. After the sulfate mixture has been dissolved, the contents of package "B" is slowly added and the mixture agitated until it reaches a state of homogeneity. The spray is then ready for use in the usual manner.

The use of starch with the copper sulfate in the manner indicated, preserves the pulverulent character of the salt so that it will not cake in the packing and will readily pass into solution when put into the spray tank. Furthermore the reaction with the lime constituent is so retarded that curdling and rapid precipitation of solid matter is prevented, and the solids remain in suspension for a long time. A spray mixture made with my ingredients is fit for use long after the best Bordeaux has deteriorated, and moreover is safe to use on delicate trees and vines since it has a minimum of free metallic copper.

I claim:

1. An intimate mixture of finely divided copper sulphate and starch to preserve the pulverulent character of the copper sulphate.

2. A spray material comprising copper sulphate, starch and lime, the starch serving to preserve the pulverulent character of the copper sulphate and to retard the reaction between the latter and the lime.

3. A composition adapted to yield a spray upon contact with water comprising, hydrated lime, calcium caseinate, copper sulphate and starch.

4. The process of making an ingredient of Bordeaux mixture which comprises coating pulverulent particles of copper sulphate with finely divided starch.

5. The process of making an ingredient of Bordeaux mixture which comprises drying copper sulphate to drive off water of crystallization, adding starch in a volume equivalent to the water evaporated, and pulverizing the mixture.

6. The process of making an ingredient of Bordeaux mixture which comprises drying copper sulphate to drive off water of crystallization, adding starch and pulverizing the mixture.

7. A spray material comprising an intimate mixture of finely divided copper sulphate which has been deprived of part of its water of crystallization, and starch.

8. A spray material comprising an aqueous mixture of copper sulphate which has been deprived of part of its water of crystallization, starch and lime.

9. A composition for yielding a spray on contact with water comprising hydrated lime and calcium caseinate, and copper sulphate and starch, maintained in two separate constituents comprising respectively hydrated lime and calcium caseinate, and copper sulphate and starch.

In testimony whereof, I have hereunto set my hand.

CARL F. GALLIGAN.